(12) United States Patent
Yamagata

(10) Patent No.: US 7,145,563 B2
(45) Date of Patent: Dec. 5, 2006

(54) METHOD FOR GENERATING MESH OF OBJECT FOR THREE-DIMENSIONAL ANALYSIS

(75) Inventor: Hiroaki Yamagata, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 10/703,716

(22) Filed: Nov. 6, 2003

(65) Prior Publication Data

US 2004/0095347 A1 May 20, 2004

(30) Foreign Application Priority Data

Nov. 15, 2002 (JP) ............................. 2002-332545

(51) Int. Cl.
*G06T 15/40* (2006.01)
*G06T 17/20* (2006.01)
(52) U.S. Cl. ...................................... 345/421; 345/423
(58) Field of Classification Search ................ 345/421, 345/423
See application file for complete search history.

(56) References Cited

U.S. PATENT DOCUMENTS

| | | | |
|---|---|---|---|
| 5,601,084 A * | 2/1997 | Sheehan et al. ............. | 600/450 |
| 5,740,342 A * | 4/1998 | Kocberber .................. | 345/420 |
| 5,760,779 A | 6/1998 | Yamashita | |
| 5,936,869 A * | 8/1999 | Sakaguchi et al. ............. | 703/1 |
| 5,946,479 A * | 8/1999 | Sakaguchi et al. ............ | 716/20 |
| 6,674,432 B1 * | 1/2004 | Kennon et al. ............. | 345/419 |
| 6,714,900 B1 * | 3/2004 | Busse et al. .................... | 703/6 |
| 6,904,395 B1 * | 6/2005 | DeJack et al. ................. | 703/7 |
| 6,947,879 B1 * | 9/2005 | Yamada et al. ................ | 703/2 |
| 2003/0076987 A1 * | 4/2003 | Wilson et al. ............. | 382/128 |

FOREIGN PATENT DOCUMENTS

| | | |
|---|---|---|
| JP | 08-016629 | 1/1996 |
| WO | WO 2005069227 A1 * | 7/2005 |

* cited by examiner

*Primary Examiner*—Ulka Chauhan
*Assistant Examiner*—Roberta Prendergast
(74) *Attorney, Agent, or Firm*—Canon U.S.A. Inc. IP Division

(57) ABSTRACT

A method for generating a mesh of an object for three-dimensional analysis includes an outer-region-element-generating step of determining a distance to which each of triangles created on the surface of the object is to be projected toward the inside of the object, and generating a pentahedral element in an outer region of the object by projecting the triangle for the determined distance. In this step, the distance for which each triangle is projected decreases as the thickness of the object at the position corresponding to the triangle decreases. Accordingly, the precision of the analysis can be increased without increasing the processing time.

12 Claims, 7 Drawing Sheets

} INSIDE OF OBJECT

METHOD FOR GENERATING MESH OF OBJECT FOR THREE-DIMENSIONAL ANALYSIS

BACKGROUND OF THE INVENTION

1. Field of the Invention

The present invention relates to a method for generating a mesh of an object for three-dimensional analysis used in the finite element method or the finite volume method.

2. Description of the Related Art

An automatic mesh-generating method in which a mesh of a three-dimensional object is automatically generated by decomposing the object into small, hexahedral elements is known in the art. In this method, the shape of the object whose mesh can be generated is limited. An automatic mesh-generating method which can be applied to an object having any shape, for decomposing the object into small, tetrahedral elements is also known in the art. This method is used in commercial tools such as IDEAS, Solid Designer, and Patran. However, this method of decomposing an object into tetrahedral elements has a disadvantage in that the precision of the analysis decreases if the object has a high aspect ratio, in other words, if the object has a distorted shape.

In particular, when the object has a high aspect ratio on the surface thereof, the precision of the analysis decreases considerably and it may even be impossible to perform the calculation. In addition, there is also a disadvantage in that the decomposition into tetrahedral elements requires a longer calculation time than the decomposition into hexahedral elements since larger numbers of nodes and elements are generated.

Accordingly, in mesh-generating programs for fluid analysis such as STAR-CD, Pro-am and CFX-Build, a mesh of an object is generated by creating triangles on the surface of the object, projecting the triangles into the object for a small distance to generate pentahedral elements called prisms or pentas, and decomposing a three-dimensional region remaining in the object into tetrahedral elements.

In addition, another automatic mesh-generating method for a three-dimensional object is disclosed in Japanese Patent No. 2,941,653. According to this method, a portion of the object is decomposed into hexahedral elements, and the remaining portion of the object is decomposed into tetrahedral elements.

On the other hand, in a simulation of an injection molding process, the object to be analyzed is thin-walled. Since this thin-walled part has a large temperature variation across the thickness and even more so at thin portions thereof, these thin portions are preferably decomposed into a plurality of layers in the thickness direction. In addition, since molten regions of the thin-walled part vary particularly along the surfaces thereof, mesh elements in the same layer preferably have a uniform size.

SUMMARY OF THE INVENTION

One feature of the present invention is to provide a method for generating a mesh of an object for three-dimensional analysis, wherein the mesh provides high-speed analysis. Among other steps, this method includes a surface-dividing step and a thickness-acquiring step. As suggested by their names, the surface-dividing step divides the surface of the object to be analyzed into triangles, while the thickness-acquiring step acquires the thickness of the object at positions corresponding to the triangles.

The method also includes an outer-region-element-generating step for determining a distance for which each triangle is to be projected toward the inside of the object. The distance is based on the thickness of the object at the position corresponding to the triangle. Thereafter, a pentahedral element in an outer region of the object is generated by projecting the triangle for the determined distance. Note that the distance for which each triangle is projected decreases as the thickness of the object at the position corresponding to the triangle decreases. The method further includes an inner-region-decomposing step of decomposing an inner region of the object into tetrahedral elements.

Further features and advantages of the present invention will become apparent from the following description of the preferred embodiments (with reference to the attached drawings).

DESCRIPTION OF THE PREFERRED EMBODIMENTS

An embodiment of the present invention will be described below with reference to the accompanying drawings.

Figure 1:
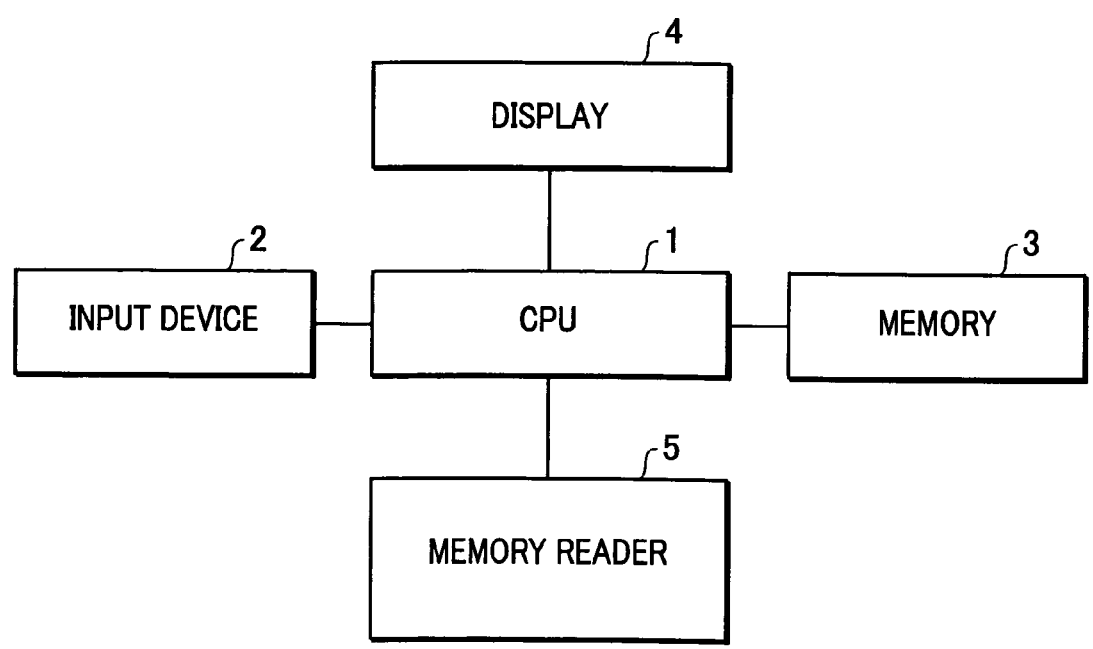
FIG. 1 is a block diagram of an information processing apparatus according to an embodiment of the present invention.

FIG. 1 is a block diagram of an information processing apparatus, which executes a mesh-generating method for the analysis of a three-dimensional object according to the present embodiment.

As shown in FIG. 1, the information processing apparatus which executes the mesh-generating method for the analysis of the three-dimensional object according to the present embodiment includes a central processing unit (CPU) 1 which performs a process in accordance with a program and data stored in a memory 3. The memory 3 can be a floppy disk (FD), a compact disc read only memory (CD-ROM), a magnetic tape, for example. The information processing apparatus also has an input device 2 such as a keyboard and a mouse used for operating the process, a display 4 which shows the result of analysis, and a memory reader 5 which reads the program and the data stored in the memory 3.

Figure 2:
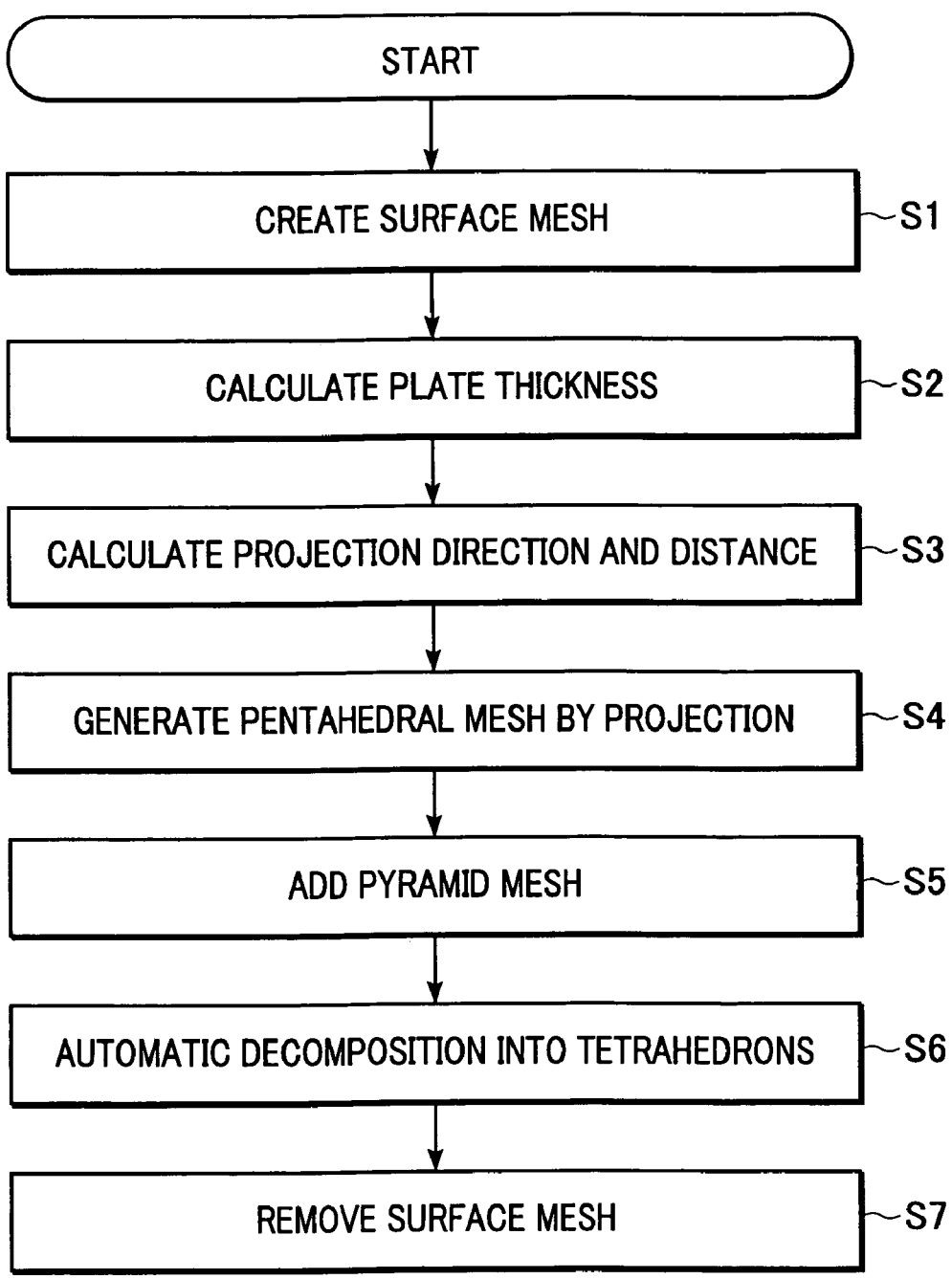
FIG. 2 is a flowchart of a mesh-generating method for the analysis of a three-dimensional object according to the embodiment.
Figure 3:
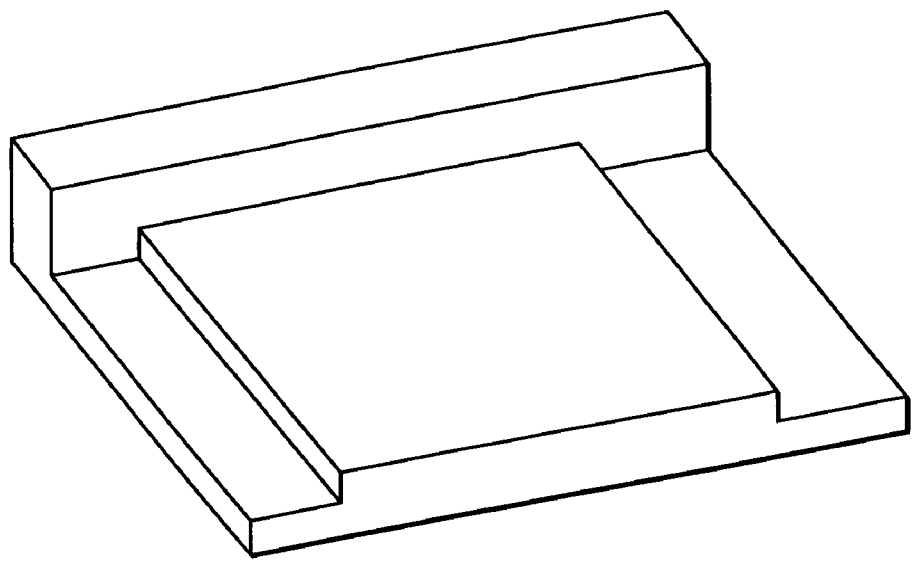
FIG. 3 is a diagram showing an example of a three-dimensional object to be analyzed according to the embodiment.
Figure 4:
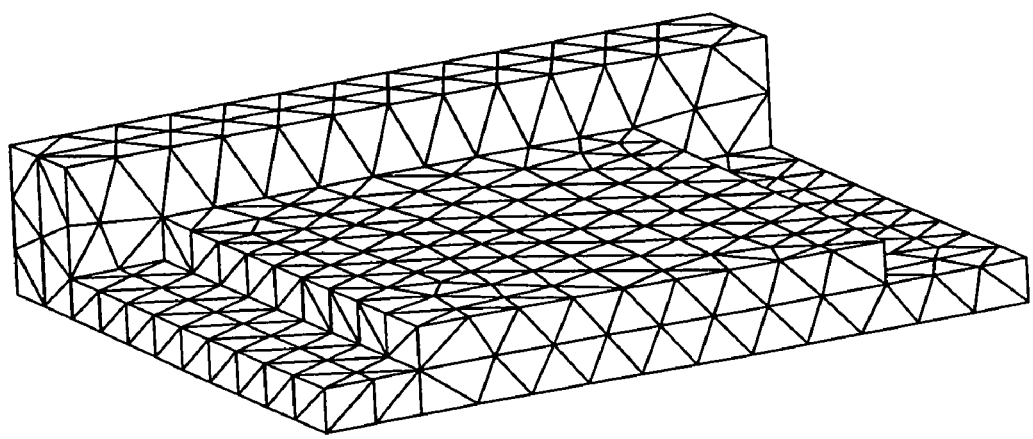
FIG. 4 is a diagram showing an example of the manner in which the surface of the object to be analyzed is divided into triangles.
Figure 5A:
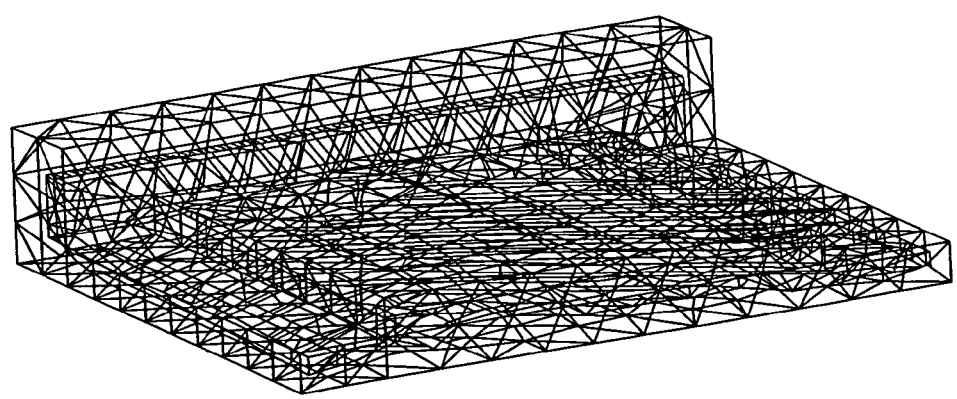
FIG. 5A is a diagram showing the entire body of the object when pentahedral elements are generated in an outer region of the object.
Figure 5B:
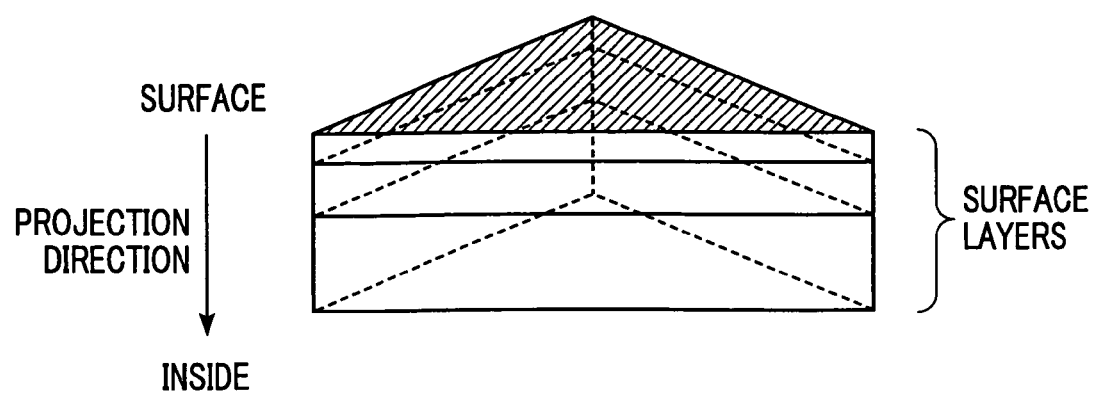
FIG. 5B is a diagram showing an example of the pentahedral elements generated in the outer region of the object.
Figure 6:
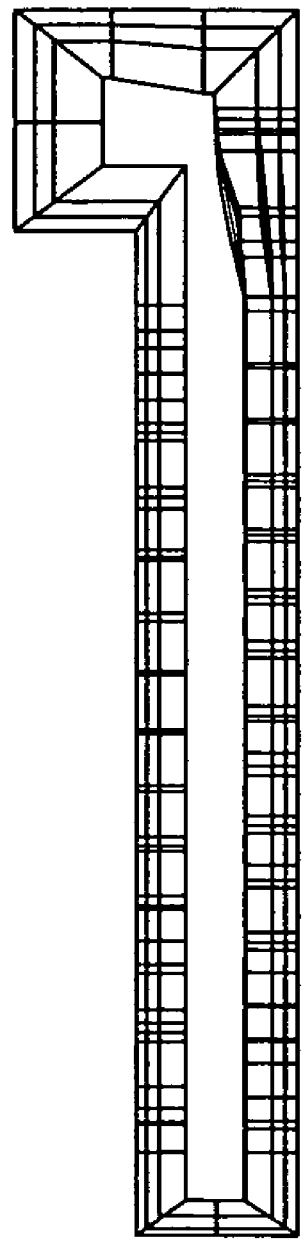
FIG. 6 is a sectional view of FIG. 5A.
Figure 7A:
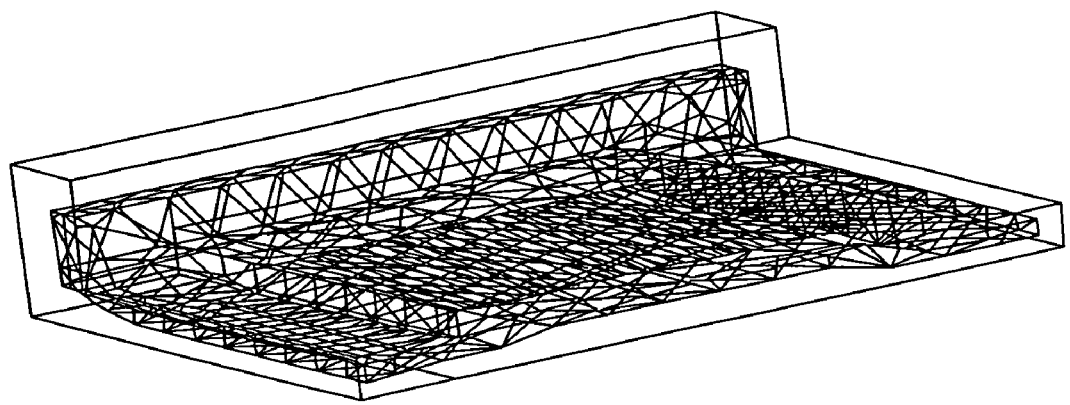
FIG. 7A is a diagram showing the entire body of the object when an inner region of the object is decomposed into elements.
Figure 7B:
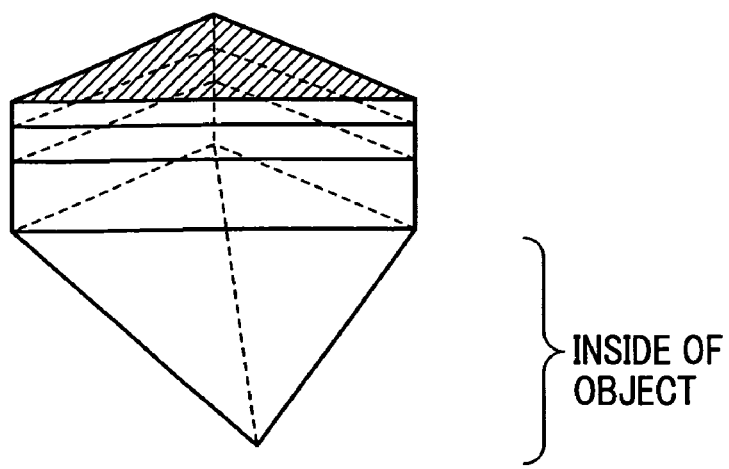
FIG. 7B is a diagram showing an example of a tetrahedral element generated in the inner region of the object.
Figure 8:
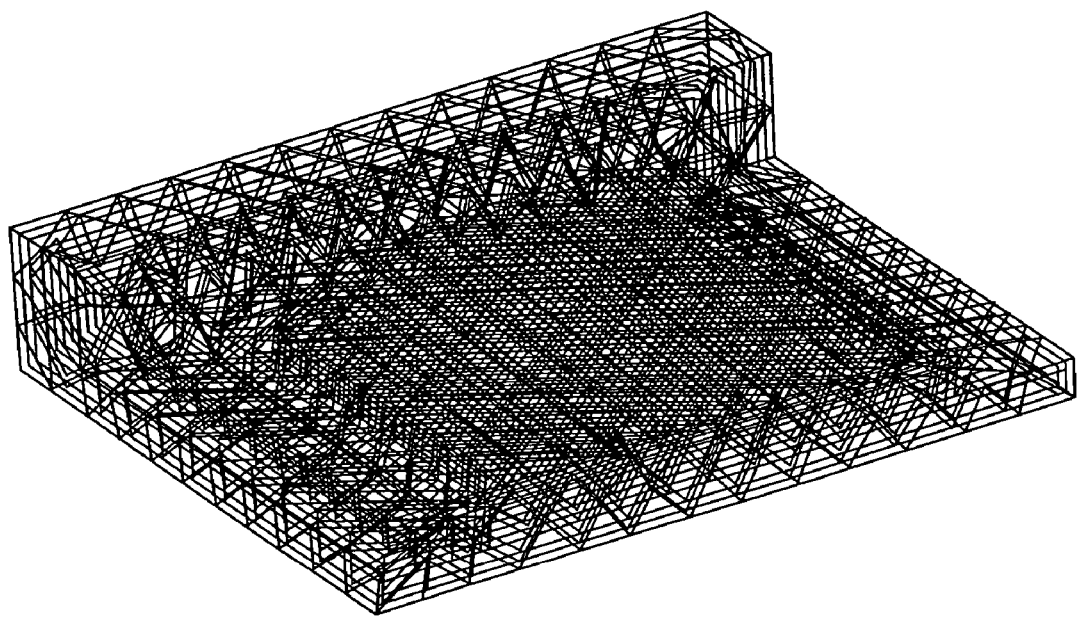
FIG. 8 is a perspective view of the object to be analyzed when the decomposition of the object is completed.

The mesh-generating method for the analysis of the three-dimensional object according to the present embodiment will be described below with reference to FIGS. 2 to 8. FIG. 2 is a flowchart of the mesh-generating method for the analysis of the three-dimensional object according to the present embodiment; FIG. 3 is a diagram showing an example of the shape of the object to be analyzed; FIG. 4 is a diagram showing the manner in which the surface of the object to be analyzed shown in FIG. 3 is divided into triangles; FIGS. 5A and 5B are diagrams showing the manner in which the triangles on the surface of the object to be analyzed shown in FIG. 3 are projected inward so that pentahedral elements are generated; FIG. 6 is a sectional view of FIG. 5A; FIGS. 7A and 7B are diagrams showing the manner in which an inner region of the object to be analyzed shown in FIG. 3 is decomposed into tetrahedral elements composed of triangles congruent to those on the surface of the object; and FIG. 8 is a diagram showing both the mesh in the outer region of the object shown in FIG. 5A and that in the inner region of the object shown in FIG. 7A.

In FIG. 2, step 1, the CPU 1 creates a surface mesh by dividing the surface of the object to be analyzed shown in FIG. 3 into triangles, as shown in FIG. 4. Then, the CPU 1 calculates the thickness of the object to be analyzed at each position thereof on the basis of computer aided design (CAD) data (Step 2). Then, the CPU 1 calculates a projection distance for each triangle on the basis of various factors including the number of surface layers to be generated along the thickness direction in the outer region of the object, the ratio of the thickness of each surface layer to the overall thickness of the object at the corresponding position, and the overall thickness of the object at the corresponding position which is calculated in Step 2 (Step 3). For example, the number of surface layers to be generated along the thickness direction and the thickness ratio may be as follows:

Number of Surface Layers: 3

Thickness Ratio of each successive layer from surface toward interior of object: 0.02, 0.03, and 0.06

As is clear from the thickness ratios shown above, the layer thickness successively increases from the surface toward the inside of the object. In short, the layer of the surface is the thinner than that of inside of the object.

Next, the CPU 1 generates pentahedral elements by projecting each of the triangle created on the surface of the object in Step 1 a plurality of times for the distance calculated in Step 3 toward the inside of the object in the direction perpendicular to the surface of the object (Step 4). Accordingly, the pentahedral elements are generated for each triangle as shown in FIG. 5B. The hatched triangle shown in FIG. 5B is one of the triangles created on the surface of the object shown in FIG. 3, and the pentahedral elements are generated by projecting this triangle in the thickness direction of the object.

FIG. 5A shows the entire body of the object in which the pentahedral elements are generated, and FIG. 6 shows the sectional view of FIG. 5A. As shown in FIG. 6, the inner region of the object to be analyzed is not yet decomposed into elements.

In the present embodiment, the entire surface of the object to be analyzed is divided into triangles, as shown in FIG. 4. Alternatively, however, quadrangles may also be created on the surface of the object in addition to the triangles. In such a case, the CPU 1 generates hexahedral elements by projecting the quadrangles, generates pyramid-shaped pentahedral elements including the sides of the hexahedral elements at the innermost position in the outer region of the object, and then generates tetrahedral elements including the tri-angles on the sides of the pyramid-shaped pentahedral elements in the inner region of the object (Step 5). Step 5 is not performed in the present embodiment since all of the elements obtained by projection are pentahedral. Accordingly, the process skips Step 5 and proceeds to Step 6.

In FIG. 2, step 6, the CPU 1 next generates tetrahedral elements including the sides of the pentahedral elements at the innermost position in the outer region of the object and thereby decomposes the inner region of the object into tetrahedral elements.

FIG. 7B shows one of the tetrahedral elements generated in the object to be analyzed, and FIG. 7A shows the entire body of the object where the inner region of the object is decomposed into the tetrahedral elements. Then, all of the three-dimensional elements are displayed, as shown in FIG. 8 (Step 7).

Thus, according to the present embodiment, as the thickness of the object decreases, the thickness of the pentahedral elements in the outer region of the object decreases proportionally, so that the precision of the analysis increases accordingly. On the contrary, at positions where the thickness of the object is large, that is, where the required precision of the analysis is not as high as that in thin portions of the object, the pentahedral elements in the outer region of the object have a relatively large thickness, so that the numbers of nodes and elements can be reduced and calculations can be performed in a short time.

The tetrahedral elements, with which lower h precision of analysis can be obtained, are generated in the inner region of the object. In addition, the thickness of the surface layers decreases toward the surface of the object to be analyzed, so that the precision of the analysis increases toward the surface of the object accordingly.

In addition, since the region close to the surface of the object is decomposed into polyhedrons with five or more sides, the number of nodes and elements can be reduced and the calculation can be performed in a shorter time compared to the case where the entire region of the object is decomposed into tetrahedral elements, which can be performed automatically.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for generating a mesh of an object for three-dimensional analysis, comprising:

a surface-dividing step of dividing the surface of the object to be analyzed into triangles;

a thickness-acquiring step of acquiring the thickness of the object at positions corresponding to the triangles;

an outer-region-element-generating step of determining a distance for which each triangle is to be projected toward the inside of the object in accordance with the thickness of the object at the position corresponding to the triangle and generating a pentahedral element in an outer region of the object by projecting the triangle for the determined distance; and an inner-region-decomposing step of decomposing an inner region of the object into tetrahedral elements, wherein, in the outer-region-element-generating step, the distance for which each triangle is projected decreases as the thickness of the object at the position corresponding to the triangle decreases and increases from the surface toward the inside of the object; and displaying said generated pentahedral and tetrahedral elements.

2. A method according to claim 1, wherein the surface of the object is divided into quadrangles in addition to the triangles in the surface-dividing step.

3. A computer-readable recording medium which stores a computer program to be executed by an information processing apparatus for generating a mesh of an object for three-dimensional analysis, the programing comprising:
  a surface-dividing step of dividing the surface of the object to be analyzed into triangles;
  a thickness-acquiring step of acquiring the thickness of the object at positions corresponding to the triangles;
  an outer-region-element-generating step of determining a distance for which each triangle is to be projected toward the inside of the object in accordance with the thickness of the object at the position corresponding to the triangle and generating a pentahedral element in an outer region of the object by projecting the triangle for the determined distance; and
  an inner-region-decomposing step of decomposing an inner region of the object into tetrahedral elements,
  wherein, in the outer-region-element-generating step, the distance for which each triangle is projected decreases as the thickness of the object at the position corresponding to the triangle decreases, and increases from the surface toward inside of the object.

4. A computer-readable recording medium according to claim 3, wherein the surface of the object is divided into quadrangles in addition to the triangles in the surface-dividing process.

5. A method of generating a mesh for an object, the method comprising:
  creating triangles on a surface of the object, each triangle located at a position on said surface;
  determining a projection distance for each triangle, wherein the projection distance is based on a thickness of the object at each position of the triangle;
  projecting each triangle for the projection distance in order to create a pentahedral element in a first region of the object,
  wherein the projection distance decreases as the thickness of the object at the position corresponding to the triangle reduces, and increases from the surface toward the inside of the object; dividing a second region of the object to create tetrahedral elements; and displaying said created pentahedral and tetrahedral elements.

6. The method of claim 5 wherein the first region is an outer region of the object and the second region is an inner region of the object.

7. The method of claim 6 further comprising creating quadrangles on the surface of the object.

8. A mesh generating unit for generating a mesh of an object for three-dimensional analysis, the mesh generating unit comprising:
  a surface-dividing unit configured to divide the surface of the object to be analyzed into triangles;
  a thickness-acquiring unit configured to acquire the thickness of the object at positions corresponding to the triangles;
  an outer-region-element-generating unit configured to determine a distance for which each triangle is to be projected toward the inside of the object in accordance with the thickness of the object at the position corresponding to the triangle and generating a pentahedral element in an outer region of the object by projecting the triangle for the determined distance; and
  an inner-region-decomposing unit configured to decompose an inner region of the object into tetrahedral elements,
  wherein, the distance determined by the outer-region-element-generating unit for which each triangle is projected decreases as the thickness of the object at the position corresponding to the triangle decreases, and increases from the surface toward inside of the object.

9. The mesh generating unit according to claim 8, wherein the surface of the object is divided into quadrangles in addition to the triangles by the surface-dividing unit.

10. A computer-readable recording medium which stores a computer program to be executed by an information processing apparatus for generating a mesh of an object for three-dimensional analysis, the program comprising:
  creating triangles on a surface of the object, each triangle located at a position on said surface;
  determining a projection distance for each triangle, wherein the projection distance is based on a thickness of the object at each position of the triangle;
  projecting each triangle for the projection distance in order to create a pentahedral element in a first region of the object,
  wherein the projection distance decreases as the thickness of the object at the position corresponding to the triangle reduces, and increases from the surface toward inside of the object; and
  dividing a second region of the object to create tetrahedral elements.

11. The computer-readable recording medium according to claim 10, wherein the first region is an outer region of the object and the second region is an inner region of the object.

12. The computer-readable recording medium according to claim 11, wherein the program further comprises creating quadrangles on the surface of the object.

* * * * *